July 30, 1963     K. R. GILFRY     3,099,299
GUIDE ATTACHMENT FOR A ROUTER
Filed Feb. 28, 1962     2 Sheets-Sheet 1
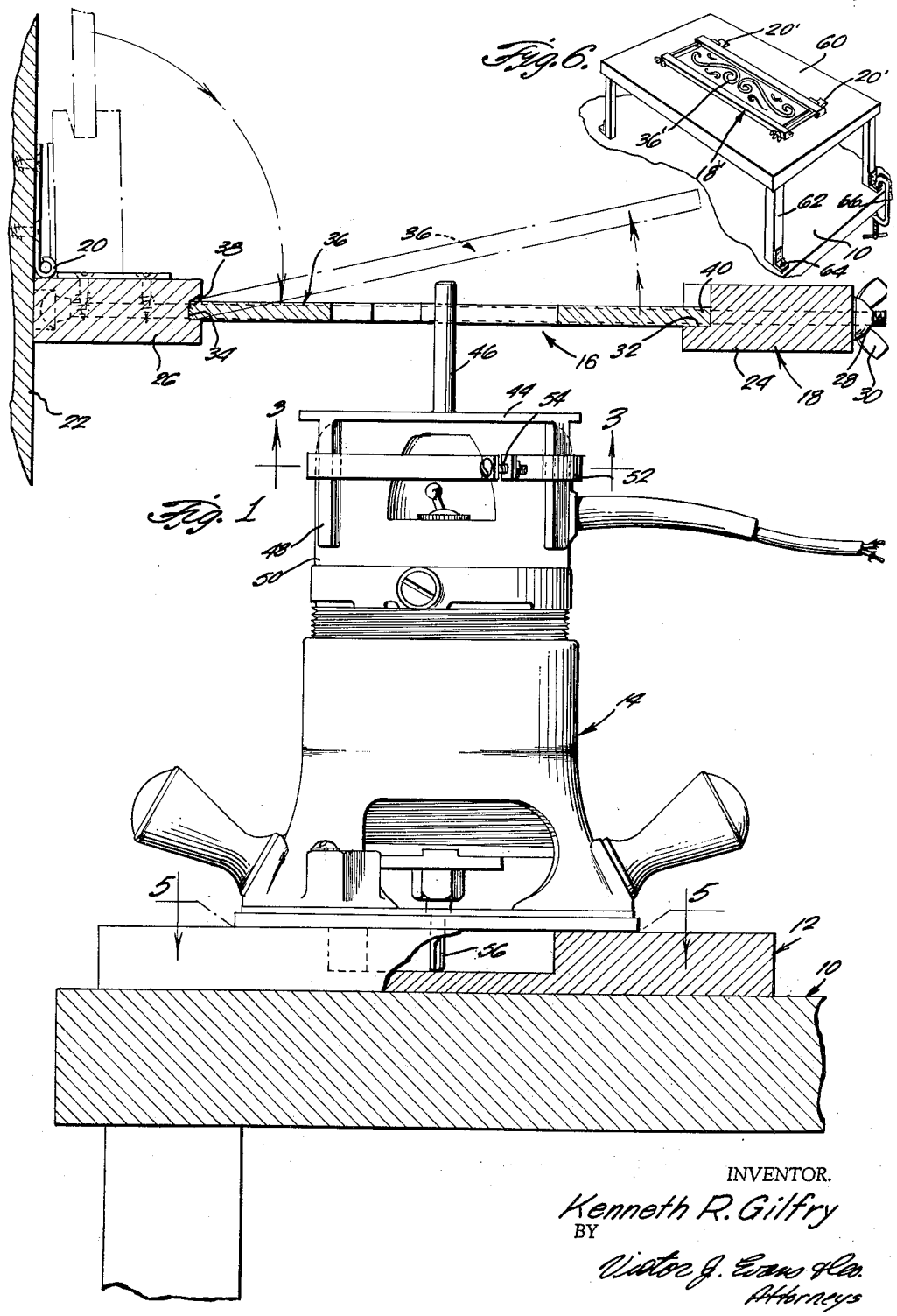
INVENTOR.
Kenneth R. Gilfry
BY
Victor J. Evans & Co.
Attorneys

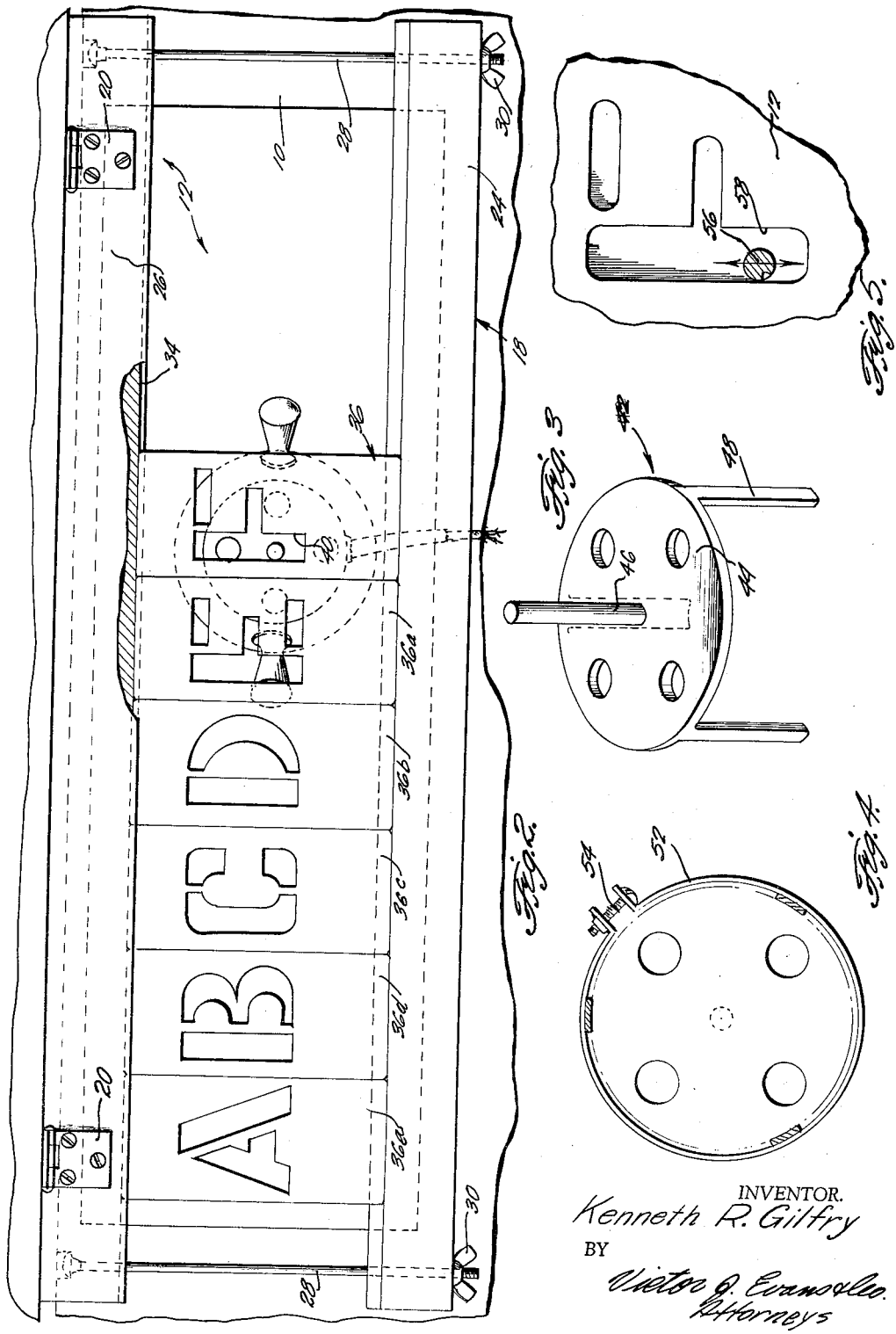

United States Patent Office 3,099,299
Patented July 30, 1963

3,099,299
GUIDE ATTACHMENT FOR A ROUTER
Kenneth R. Gilfry, 7431 Artesia St., Buena Park, Calif.
Filed Feb. 28, 1962, Ser. No. 176,296
2 Claims. (Cl. 144—144)

The present invention relates to a guide attachment for a router.

An object of the present invention is to provide an attachment for a router so that the router may be used to duplicate patterns of all types such as letters, numbers, scroll, silhouettes, scalloped moldings, and the like.

Another object of the present invention is to provide an attachment for a router which lends itself to easy attachment to and detachment from the motor housing of a router, the device including a frame which may be mounted permanently against the wall surface or may be mounted so as to be portable for carrying along with the router from one job to another.

A further object of the present invention is to provide a pattern making attachment for a router which is simple in structure, one sturdy in construction and having long life characteristics, one economical to construct and assemble, and one which is highly effective in action.

These and other objects and advantages of the present invention will be fully understood when the following description is considered and taken in connection with the annexed drawings, in which:

FIGURE 1 is a view in elevation and partially in section showing the device of the present invention in use, FIGURE 2 is a top plan view of the assembly shown in FIGURE 1, FIGURE 3 is a perspective view of the probe member assembly, removed from the motor housing, FIGURE 4 is a plan view of the clamp ring used with the device of FIGURE 3, FIGURE 5 is a view on an enlarged scale, of the work piece being routed, the router blade being shown in section, and FIGURE 6 (Sheet 1) is a view on a reduced scale of another embodiment of the invention showing the pattern frame supported above a work bench.

With reference to the drawings in detail, the reference numeral 10 designates a work bench having a horizontally disposed work piece 12 thereon, the work piece 12 is intended to be routed using a conventional router 14 and the device of the present invention which is designated generally by the reference numeral 16.

The device of the present invention includes a horizontally disposed frame 18 connected by hinges 20 to a vertical wall surface 22.

The frame 18 consists in a front member 24 and a rear member 26 secured together by bolts 28 which traverse holes provided in the end portions of the front and rear members 24 and 26.

Wing nuts 30 are provided on the bolts 28 for tightening the front member 24 toward the rear member 26.

The front member 24 is provided with a shoulder 32 and the rear member 26 is provided with a groove 34.

A horizontally disposed pattern element 36 is removably supported in the frame 18 and has one end portion 38 seated in the groove 34 and has the other end portion 40 resting upon the shoulder 32.

The pattern element 36 is provided with a cutout portion 40 which corresponds to the pattern to be cut in the workpiece 12.

The device of the present invention also includes a probe assembly, designated generally by the reference numeral 42, and shown most clearly in FIGURE 3. The assembly 42 includes a base plate 44, an upright finger 46 rising from the mid-part of the base plate 44, and a plurality of vertically disposed legs 48 depending from the perimeter of the base plate 44 and arranged in spaced relation thereon.

The legs 48 are spaced from each other and the diameter of the base plate 44 is such that the legs 48 embracingly receive therebetween the upper end portion of the motor housing 50 of the router 14, as shown in FIGURE 1.

When the legs 48 are in position about the upper end portion 50 of the router 14, a clamp ring 52 is employed to be secured in position on the housing 14 with the base plate 44 resting upon the upper end of the housing 14. The clamp ring 52 includes a nut and bolt assembly 54 which forms a means for adjustably securing the ring in place about the legs 48 in order that they be removably secured to the motor housing of the router 14.

Depending from the router 14 is its blade 56 rotatable about a vertical axis and operable to rout out a recess 58 in the work piece 12, as shown in FIGURES 1 and 5.

In FIGURE 6 there is shown a modified form of the means for supporting the frame 18' above the work bench 10. This means consists in a table member 60 having an opening in the middle thereof over which the frame 18' is positioned and connected thereto by hinges 20'.

The table member 60 includes legs 62 each having an angle shaped bracket 64 on the lower end thereof by means of which the legs 62 may be secured to the work bench 10 either by screws extending through the bracket or by means of a temporary clamp such as the one shown in FIGURE 6 and designated by the reference numeral 66.

In use, one or more of the pattern elements 36 may be inserted in the frame 18, 18', as shown in FIGURE 2 in which the pattern element 36 is shown in place with its end portions received in the groove 34 and resting upon the shoulder 32, respectively, and arranged in side by side abutting relation with respect to other pattern elements 36a, 36b, 36c, 36d, and 36e.

Alternatively, the frame 18 may be supplied with a single pattern element 36', as in FIGURE 6, in which the cutout portion is an ornamental scroll or design, as desired.

With the work piece 12 in place on the bench 10 and the router 14 in position to make the cut in the work piece 12, the frame 18, 18', is moved to the horizontal position superimposed above and spaced from the motor housing of the router 14 and with the finger 46 received in one part of the pattern element 36.

Manual moving, in a horizontal plane, of the router 14 on the work piece 12 with the finger 46 following the wall of the cutout portion of the pattern element 36, the blade 56 will cut the work piece 12 to conform to the cutout portion of the pattern element.

While the preferred forms of the invention are shown other forms are contemplated and numerous changes and modifications may be made therein without departing from the spirit of the invention as set forth in the appended claims.

What is claimed is:

1. The combination with a router having an upright motor housing adapted for horizontal sliding movement over a horizontally disposed work piece, of a pattern assembly comprising a horizontally disposed frame arranged in superimposed spaced relation relative to said router housing, means securing said frame in position relative to said housing, a horizontally disposed pattern element removably supported in said frame, said element having a cutout portion corresponding to the pattern to be routed in said work piece, a base plate, an upright finger rising from said base plate, a plurality of legs depending from said base plate and being spaced about the perimeter thereof, said legs embracingly receiving therebetween the portion of said housing adjacent the upper end, and a clamp ring surrounding said legs and releasably holding said legs to said housing, said finger extending into said element cutout portion for sliding engagement with the walls of said cutout portion responsive to sliding movement of said housing over said work piece when said frame and said pattern element are in the superimposed relation position with respect to said housing and said housing is in position for sliding movement over said work piece.

2. The combination with a router having an upright motor housing adapted for horizontal sliding movement over a horizontally disposed work piece, of a pattern assembly comprising a horizontally disposed frame arranged in superimposed spaced relation relative to said router housing, means securing said frame in position relative to said housing, a horizontally disposed pattern element removably supported in said frame, said element having a cutout portion corresponding to the pattern to be routed in said work piece, a base plate, an upright cylindrical finger rising from the mid-part of said base plate, a plurality of legs depending from said base plate and being spaced about the perimeter thereof, said legs embracingly receiving therebetween the portion of said housing adjacent the upper end thereof with the upper end of said housing abutting the underface of said base plate, and a clamp ring surrounding said legs and releasably holding said legs to said housing, said finger extending into said element cutout portion for sliding engagement with the walls of said cutout portion responsive to sliding movement of said housing over said work piece when said frame and said pattern element are in the superimposed relation position with respect to said housing and said housing is in position for sliding movement over said work piece.

References Cited in the file of this patent

UNITED STATES PATENTS

| | | |
|---|---|---|
| 799,825 | Behee | Sept. 19, 1905 |
| 2,454,114 | Albree | Nov. 16, 1948 |
| 2,842,173 | Turner et al. | July 8, 1958 |
| 2,864,283 | Mann | Dec. 16, 1958 |